United States Patent
Bertsch

(10) Patent No.: US 10,859,854 B2
(45) Date of Patent: Dec. 8, 2020

(54) SCREW PART AND HINGE ARRANGEMENT HAVING SUCH A SCREW PART

(71) Applicant: OBE GMBH & CO. KG, Ispringen (DE)

(72) Inventor: Stefan Bertsch, Vaihingen an der Enz (DE)

(73) Assignee: OBE GMBH & CO. KG, Ispringen (DE)

( * ) Notice: Subject to any disclaimer, the term of this patent is extended or adjusted under 35 U.S.C. 154(b) by 30 days.

(21) Appl. No.: 16/320,073

(22) PCT Filed: Jul. 25, 2017

(86) PCT No.: PCT/EP2017/068796
§ 371 (c)(1),
(2) Date: Jan. 23, 2019

(87) PCT Pub. No.: WO2018/019851
PCT Pub. Date: Feb. 1, 2018

(65) Prior Publication Data
US 2019/0258079 A1      Aug. 22, 2019

(30) Foreign Application Priority Data
Jul. 26, 2016     (DE) .......................... 10 2016 213 651

(51) Int. Cl.
*G02C 5/22*       (2006.01)
*F16B 33/00*     (2006.01)

(52) U.S. Cl.
CPC ............ *G02C 5/2281* (2013.01); *F16B 33/00* (2013.01); *G02C 5/22* (2013.01)

(58) Field of Classification Search
CPC ...... G02C 5/22; G02C 5/2254; G02C 5/2281; F16B 33/00; E05D 5/121;
(Continued)

(56) References Cited

U.S. PATENT DOCUMENTS 2,678,585 A * 5/1954 Ellis ......................... G02C 1/02
351/145
2,828,668 A * 4/1958 De Angelis .......... G02C 5/2281
351/109
(Continued)

FOREIGN PATENT DOCUMENTS

CN         1360684 A        7/2002
CN       200959055 Y       10/2007
(Continued)

OTHER PUBLICATIONS

International Search Report for PCT/EP2017/068796, dated Feb. 7, 2019 with English translation.

(Continued)

*Primary Examiner* — Roberta S Delisle
(74) *Attorney, Agent, or Firm* — Stephen T. Olson; Harness, Dickey & Pierce, P.L.C.

(57) ABSTRACT

A screw part has a shank with a threaded portion having at least one external thread turn, and a sleeve that surrounds the shank in a circumferential direction around more than three-fourths of the circumference. The sleeve extends along a sleeve portion in a longitudinal direction of the shank. The sleeve has at least one radial elevation structure on an outer circumferential face. The at least one radial elevation structure has at least one structural element that has an elastic design in the radial direction. The at least one radial elevation structure has an extent, on the outer circumferential face of the sleeve along the longitudinal direction, that is greater than a width of the at least one structural element.

17 Claims, 4 Drawing Sheets

(58) Field of Classification Search
CPC ........ E05D 2005/102; E05D 2005/104; E05D 2005/108; F16C 11/00
USPC .................................. 16/228, 356, 365, 386
See application file for complete search history.

(56) References Cited

U.S. PATENT DOCUMENTS

| | | | | |
|---|---|---|---|---|
| 2,939,168 | A | * | 6/1960 | Ferron ................. G02C 5/2281 16/228 |
| 3,042,961 | A | * | 7/1962 | Tieri ................... F16B 19/1081 16/228 |
| 3,383,799 | A | * | 5/1968 | Anderson ................. E06B 3/12 49/397 |
| 4,076,394 | A | | 2/1978 | Nakamura |
| 4,256,388 | A | * | 3/1981 | Beyer ..................... F16B 35/00 16/228 |
| 7,010,831 | B1 | | 3/2006 | Beck et al. |

FOREIGN PATENT DOCUMENTS

| | | |
|---|---|---|
| CN | 101988539 A | 3/2011 |
| DE | 3318794 C2 | 5/1987 |
| DE | 19931837 A1 | 2/2001 |
| FR | 2363807 A1 | 3/1978 |
| FR | 2991467 A1 | 12/2013 |
| WO | 2016066583 A1 | 5/2016 |

OTHER PUBLICATIONS

International Search Report for PCT/EP2017/068796, ISA/EP, Rijswijk, NL, dated Oct. 18, 2017 with English translation.
Written Opinion of the ISA for PCT/EP2017/068796, ISA/EP, Rijswijk, NL, dated Oct. 18, 2017.

* cited by examiner

SCREW PART AND HINGE ARRANGEMENT HAVING SUCH A SCREW PART

CROSS-REFERENCE TO RELATED APPLICATIONS

This application is a 371 U.S. National Stage of International Application No. PCT/EP2017/068796, filed Jul. 25, 2017. This application claims priority to German Patent Applications No. 10 2016 213 651.8, filed on Jul. 26, 2016. The entire disclosures of the above applications are incorporated herein by reference.

The invention relates to a screw part and a hinge arrangement having such a screw part.

In particular for connecting eyeglass parts to one another, for example for connecting a middle part of eyeglasses to an earpiece, screw parts are known that have a shank, which in a threaded portion has at least one external thread turn, at least in areas. A sleeve is provided which surrounds the shank in a sleeve portion, viewed in the circumferential direction. This sleeve has a smooth outer circumferential face, and is matched to a borehole into which the screw part is inserted as intended in order to connect two parts, in particular two parts of a hinge arrangement, in such a way that initially no, or only insignificant, friction torque results during insertion of the screw part. When the screw part is screwed into an internal thread, the sleeve at a distal end also comes into engagement with the internal thread, so that the sleeve is compressed, at least in areas. Due to the resulting expansion of the sleeve, viewed in the radial direction, on the one hand, and the engagement of the sleeve with the thread on the other hand, a friction torque results via which, for example, ease or difficulty of operation of a hinge arrangement having the screw part may be adjusted. However, it has been shown that in practice, it is difficult to adjust the friction torque in a defined manner. During manufacture of the sleeve, tolerances with regard to their extent in the longitudinal direction of the shank necessarily result, so that the engagement with the thread varies, depending on the length that is actually present, as the result of which the friction torque ultimately also varies. For an application for eyeglasses, for example, this may result in undesirable falling of an earpiece relative to a middle part of the eyeglasses, due to the friction torque being too small, or that the earpiece is difficult to move when the friction torque is too great. In addition, the screw part is difficult to handle, in particular because it may fall out of the borehole unhindered prior to being screwed down, since the friction torque does not develop until the screwing operation.

The object of the invention is to provide a screw part and a hinge arrangement for which the stated disadvantages do not occur.

The object is achieved as set forth in the subject matter of the independent claims. Advantageous embodiments result from the subclaims.

The object is achieved in particular by providing a screw part that has a shank having at least one external thread in a threaded portion, at least in areas. The screw part also has a sleeve that surrounds the shank, viewed in the circumferential direction, around more than three-fourths of the circumference. The sleeve extends along a sleeve portion in the longitudinal direction of the shank. It is provided that the sleeve has at least one radial elevation structure on an outer circumferential face. The at least one radial elevation structure has at least one structural element that has an elastic design in the radial direction, wherein the at least one radial elevation structure also has an extent, on the outer circumferential face of the sleeve along the longitudinal direction, that is greater than a width of the at least one structural element, preferably greater than a width of the elevation structure. The screw part has advantages over the prior art. In particular, the radial elevation structure, unlike the situation with a smooth circumferential face, already provides a friction torque, which may be defined with great accuracy due to the specific design of the radial elevation structure, during insertion of the screw part into a borehole. The definition of the friction torque depends in particular on the shape and configuration of the radial elevation structure at the circumferential face, and optionally the number of radial elevation structures, wherein the exact longitudinal extent of the sleeve has a minor influence on the friction torque. For this reason, tolerances with regard to the longitudinal extent of the sleeve at most have a minor impact, which allows a precise and narrow-tolerance adjustment of the friction torque. In particular, due to the design of the at least one radial elevation structure, the friction torque may be selected in such a way that compression of the sleeve and/or engagement with an internal thread by the sleeve are/is no longer required. Nevertheless, such compression and/or such engagement may be additionally provided. With the aid of the radial elevation structure, it is also possible to compensate for out-of-round eccentricities of a borehole into which the screw part is inserted. The radial elevation structure is also more elastic than would be the case for the sleeve when only its diameter had been increased, with an otherwise smooth circumferential face. Overall, the at least one radial elevation structure provides an option for setting a defined friction torque with improved tolerance compensation, so that it is possible in particular that an earpiece that is fastened to a middle part of eyeglasses in this way will not fall off or present difficulties in operation. The friction torque of the screw part proposed herein also has greatly reduced fatigue when a hinge arrangement equipped with same is actuated over the long term, wherein in particular a friction torque that prevents an earpiece from falling decreases to a much lesser extent than in the situation known from the prior art.

The field of application of the screw part is by no means limited to a hinge arrangement. In general, the screw part may be used with or on any design of fastening arrangement, for example also in a closing block of an eyeglass frame, but also outside the field of eyeglasses.

That the shank has at least one external thread turn means in particular that the shank may have a threaded structure, which for example may have only one external thread that extends only over a certain section, in particular not over the full circumference. In addition, multiple partial external threads, in particular offset relative to one another in the circumferential direction, may be provided. Of course, it is also possible for the shank to have an external thread that is continuously provided on the shank, at least in areas, as is the case for a common screw, for example.

That the sleeve surrounds the shank, viewed in the circumferential direction, around more than three-fourths of the circumference may in particular mean that the sleeve does not have a closed design; in particular, it may have a slot that extends in the longitudinal direction. The sleeve may then be easily arranged on the shank, for example by clipping or mounting.

However, one exemplary embodiment is particularly preferred in which the sleeve completely surrounds the shank, viewed in the circumferential direction. In this case, the sleeve preferably has a closed design in the circumferential direction.

That the sleeve extends along a sleeve portion, viewed in the longitudinal direction of the shank, means in particular that the sleeve does not have to surround the shank along its entire longitudinal extent or axial extent. Rather, it is provided in particular that the shank has at least one longitudinal portion that is free of the sleeve, in which the shank thus does not have the sleeve. The sleeve portion, in contrast, is the portion of the shank in which the shank has or bears the sleeve.

Accordingly, a threaded portion is understood to mean a portion of the shank in which the at least one external thread turn is situated. It is possible for the external thread turn to extend as an external thread over the entire length of the shank. However, the threaded portion preferably extends only along a portion of the entire longitudinal extent of the shank. The sleeve portion and the threaded portion, viewed in the longitudinal direction, are preferably offset relative to one another. In particular, it is provided that the sleeve portion, viewed in the screw-in direction of the screw part into a threaded bore, is situated behind the threaded portion. It is possible for the sleeve portion to overlap with the threaded portion in areas. However, it is also possible for the sleeve portion in particular to directly adjoin the threaded portion, without overlap. Lastly, it is also possible for the sleeve portion to be spaced apart from the threaded portion, viewed in the longitudinal direction.

A longitudinal direction or axial direction is understood here in particular to mean a direction that corresponds to the direction of the longitudinal extent of the shank, and in particular points in the direction of an axis of symmetry of the shank. A radial direction is perpendicular to the longitudinal direction and intersects same. A circumferential direction concentrically surrounds the longitudinal direction.

An outer circumferential face of the sleeve is understood in particular to mean a circumferential face that faces away from the shank, i.e., that points outwardly on the screw part.

The radial elevation structure may have one structural element. In this case, the radial elevation structure and the structural element are identical, or the radial elevation structure is formed by the structural element. However, it is also possible for the at least one radial elevation structure to have a plurality of elastically designed structural elements, in this case the radial elevation structure being formed by the plurality of the structural elements associated with it.

It is possible for the sleeve to have a plurality of radial elevation structures. It is particularly preferred that multiple radial elevation structures, viewed in the circumferential direction, are distributed along the circumferential face of the sleeve, in particular symmetrically with identical spacing from one another, so that directly adjacent elevation structures preferably have the same angular distances with respect to one another. It is possible for the individual radial elevation structures to either have one structural element or to be formed from a plurality of structural elements. It is also possible in particular for at least one first radial elevation structure to be formed from a single structural element, wherein at least one second radial elevation structure is formed from a plurality of structural elements. For example, a first elevation structure that is formed from a single structural element may have a rib, extending in the axial direction, as the structural element, wherein for example a second elevation structure that is formed from a plurality of structural elements may have a plurality of adjacent punctiform or knob-shaped elevations as radial structural elements, wherein this arrangement of the adjacently situated structural elements extends along the longitudinal direction on the outer circumferential face of the sleeve.

A width of the at least one structural element or of the elevation structure is understood in particular to mean an extent of the structural element or of the elevation structure in a direction that is perpendicular to a direction of the longest extension of the radial elevation structure with which the structural element is associated. For example, if the radial elevation structure has a longest extent in the axial or longitudinal direction, the width of the at least one structural element or of the radial elevation structure extends in particular in the circumferential direction. The longest extent of the at least one radial elevation structure always preferably extends at least substantially in the longitudinal direction, wherein the radial elevation structure may also have a helical, spiral, or inclined course.

According to one preferred exemplary embodiment, the screw part is designed as a screw, in particular as a screw having a head on a first end of its shank. The screw preferably has the threaded portion on a second end facing away from the head. The sleeve portion is preferably situated between the first end having the head, and the second end having the threaded portion. It is possible for the sleeve to protrude into the threaded portion and to partially cover the thread, in which case the sleeve portion on the one hand and the threaded portion on the other hand overlap in areas.

A torque introduction means, for example a slot engagement, a cross slot engagement, a star-shaped engagement, a Torx engagement, or the like, is preferably situated at the head.

It is also possible for the screw part to be designed as a threaded pin or as a grub screw. In this case, the screw part preferably has no head. In addition, it is possible for the screw part to be designed as a stay bolt. A stay bolt in particular is a threaded pin which is fixedly connected or connectable to another element, and which may be designed as a welding stud, for example. Other designs of the screw part are also possible.

The screw part is preferably configured for connecting two eyeglass parts to one another, in particular for use in a hinge arrangement between a first eyeglass part and a second eyeglass part, in particular between a middle part of eyeglasses and an earpiece. It is then possible in particular for the screw part to have a metric nominal diameter of at least M 1.2 to M 1.6 maximum, preferably M 1.4. However, the invention is not limited to such a design of the screw part. Rather, the design of the screw part proposed herein may also be used for other, in particular larger, screw parts. However, the advantages described herein apply in particular for eyeglass parts.

The screw part may also be used in particular for a closing block of an eyeglass frame, but also outside the technical field of eyeglass frames.

According to one refinement of the invention, it is provided that the at least one elevation structure extends along at least two-thirds of the height of the sleeve, measured in the longitudinal direction. It may thus be ensured that, by means of the at least one elevation structure, a friction torque may be generated very effectively in a borehole that accommodates the screw part.

According to one refinement of the invention, it is provided that the at least one elevation structure extends completely over the entire height of the sleeve, measured in the longitudinal direction. This allows particularly effective provision of the friction torque.

According to one refinement of the invention, it is provided that the at least one elevation structure has a rib that extends in the longitudinal direction. In particular, it is possible for the at least one elevation structure to be made up of a rib that extends in the longitudinal direction. The rib then forms a single structural element, which forms the at least one radial elevation structure.

Alternatively or additionally, it is possible for at least one elevation structure to have a plurality of knobs. A knob is understood in particular to mean an elevation that is substantially circular, preferably circular, with respect to its border, which preferably may have a hemispherical, partially spherical, or spherical segment-shaped design. In this case the knobs form structural elements which together form the at least one elevation structure.

Alternatively or additionally, it is possible for at least one elevation structure to have a linear, spindle-shaped, helical, or conical elevation as the structural element. The structural element may thus in particular also be a spiral or helical elevation. A linear elevation may in particular be designed as a rib. In addition, it is possible for an elevation structure designed as a rib to have a semicylindrical or partially cylindrical design or a half-conical or partially conical design, and thus to have an overall cylindrical or conical design.

Alternatively or additionally, it is possible for the at least one structural element of the at least one elevation structure (viewed in the cross section, wherein the longitudinal direction and/or the longest extent of the structural element are/is perpendicular to the cross-sectional plane) to have a rounded, in particular partially cylindrical, partially conical, or partially spherical contour, or also to have an angular, in particular polygonal, contour. Additionally or alternatively, the at least one structural element may preferably have such a contour also in the longitudinal section.

According to one refinement of the invention, it is provided that the sleeve has a plurality of elevation structures on its outer circumferential face, the elevation structures preferably being arranged symmetrically, in particular at equal angular intervals, along a circumferential line of the sleeve. In particular, by means of a plurality of elevation structures, out-of-round eccentricities in a borehole in which the screw part engages may be easily compensated for due to the fact that the various elevation structures may be radially compressed in various ways.

Preferred exemplary embodiments of the screw part have three, four, six, eight, or some other number of elevation structures on the outer circumferential face of the sleeve. It is noted that each elevation structure may be formed from a single structural element or may also have multiple structural elements.

According to one refinement of the invention, it is provided that the sleeve as a whole has an elastic design. The overall sleeve is particularly preferably made of an elastic material. It is particularly preferably provided that the sleeve has a one-piece design with the at least one elevation structure.

The elastic properties of the elevation structure and also of the sleeve as a whole, which are used for tolerance compensation, for compensating for out-of-round eccentricities, and for achieving a friction torque when the screw part is introduced into a borehole, are provided in a particularly suitable and effective manner when the sleeve as a whole has an elastic design, in particular when it is made from an elastic material in one piece with the at least one elevation structure.

It is particularly preferably provided that the sleeve contains at least one plastic or is made of at least one plastic. The sleeve particularly preferably contains an elastomer or is made of an elastomer.

According to one refinement of the invention, it is provided that the shank in the sleeve portion is extrusion-coated with the sleeve. The sleeve is preferably situated on the shank by plastic injection molding. In the process, the shank in the sleeve portion is extrusion-coated with the sleeve. Prior to the injection molding of the sleeve in the sleeve portion, the shank preferably has an injection molding geometry. In particular, the shank in the sleeve portion preferably springs back, viewed in the radial direction. Additionally or alternatively, an adhesion-promoting structure, for example in the form of grooves or other types of elevations and/or depressions, which promotes adhesion of the material of the sleeve in the sleeve portion on the shank is preferably provided in the sleeve portion on the shank.

It has been found that the sleeve is preferably injected up to the threaded portion of the shank, so that after injection of the sleeve, the sleeve portion and the threaded portion overlap in areas. It has also been found that an injection mold in the area of the thread is very difficult to seal off, so that ultimately the axial extent of the sleeve on the shank is not well defined, resulting in tolerances with regard to the actual longitudinal extent of the sleeve. For conventional screw parts of the type discussed at the outset, this is critical due to the fact that the friction torque here is ultimately generated by compression of the sleeve when the sleeve portion, which overlaps the threaded portion, is screwed into an internal thread. However, for the screw part proposed here, these tolerances no longer play a relevant role, since the desired friction torque in any case is essentially already provided by the at least one radial elevation structure, so that the back-compression effect may possibly be dispensed with entirely, or at most is of secondary importance.

This consideration results in a further advantage of the screw part proposed herein: Since compression in the internal thread when screwing in the screw part is ultimately no longer a factor due to the fact that the at least one radial elevation structure already results in a constant friction torque during insertion of the screw part, the same screw part may be used for a number of applications without length adjustment, in particular for eyeglass hinges of various widths, without the need to adjust the length of the screw part and in particular of the sleeve. Namely, it is possible on the one hand to dispense with the back-compression effect entirely, so that the sleeve does not have to engage with an internal thread at all, and on the other hand there is no cause for concern if the sleeve is screwed slightly farther into an internal thread in one application than in some other application, since with regard to the constant friction torque that is provided by the at least one radial elevation structure, this plays a lesser role in the definition of the overall friction torque. The number of screw parts to be kept on hand for various applications, and thus in particular the number of various screw part variants, may therefore be reduced.

It has also been found that the sleeve portion and the threaded portion of the screw part do not necessarily have to overlap. In fact, it is also possible that the sleeve does not protrude into the area of the thread.

As a result of the sleeve not being dependent on the back-compression effect, the screw part may be reused more times, either because the sleeve is not destroyed in the area of an internal thread into which the threaded portion of the shank is screwed, or because such impairment of the friction torque to be achieved may possibly be of secondary importance.

According to one refinement of the invention, it is provided that the shank of the screw part contains at least one plastic or is made of plastic, or that the shank contains at least one metal or contains at least one metal alloy or is made of a metal or a metal alloy. The shank of the screw part, and thus its base body in a manner of speaking, may thus be metallic or made of plastic.

According to one refinement of the invention, it is provided that the sleeve protrudes into the threaded portion of the shank. The threaded portion of the shank hereby adjoins in particular the sleeve portion of the shank, with the sleeve overlapping with the threaded portion. In this case, an axial compression, described above, of the sleeve when screwing the external thread of the shank into an internal thread is possible, as the result of which an additional friction torque may be provided besides the constant friction torque that is provided by the at least one radial elevation structure. However, it is also possible that the sleeve does not protrude into the threaded portion of the shank, as described above.

The object is achieved by providing a hinge arrangement having a first hinge part with a threaded bore, and a second hinge part with a through hole, the through hole and the threaded bore being configured to align with one another in the mounted state of the hinge arrangement. The hinge arrangement has a screw part according to one of the above-described exemplary embodiments, the at least one external thread of the screw part being configured to engage with an internal thread of the threaded bore, and the sleeve being configured to be in frictional contact with the through hole when the sleeve portion of the screw part is inserted into the through hole. A constant friction torque is thus in particular already advantageously generated as soon as the screw part with the sleeve portion engages with the through hole, and the friction torque may be adjusted in a defined manner via the geometric design of the sleeve and in particular of the at least one elevation structure. There is no need for a back-compression effect of the sleeve in the threaded bore, although this may additionally occur. A continuous connection results from the lateral contact of the sleeve in the through hole. Due to the constant friction torque provided by the at least one elevation structure, in comparison to a sleeve having a flat circumferential face it is possible to realize an equally high friction torque within the hinge arrangement with a reduced tightening torque of the screw part. Thus, in contrast to known screw parts, the screw part allows easier regulation of the friction torque in the hinge arrangement. In addition, the screw part is already secured against loss upon insertion into the through hole. A more constant, uniform friction is achieved in comparison to a sleeve that is smooth on the outer circumferential face.

The hinge parts of the hinge arrangement may have various designs, in particular with a different number of tabs. For example, it is possible for the first hinge part to have a two-tab design and the second hinge part to have a one-tab design. It is also possible for the first hinge part to have a three-tab design and the second hinge part to have a two-tab design. Other combinations of numbers of tabs for the first hinge part and the second hinge part are also possible. In addition, it is not absolutely necessary for the first hinge part to have more tabs than the second hinge part. Rather, in particular, a reverse configuration or equal numbers of tabs is/are also possible.

A through hole is understood in particular to mean a borehole that is free of an internal thread, thus, that has no internal thread and in this regard is not designed as a threaded bore.

In particular, the boreholes of the hinge parts are matched to one another in such a way that the threaded bore of the first hinge part is aligned with the through hole of the second hinge part in the mounted state of the hinge arrangement. In addition, the internal thread of the threaded bore is matched to the at least one thread turn of the screw part in such a way that the at least one external thread can engage with the threaded bore and with the internal thread.

According to one refinement of the invention, it is provided that the through hole and the sleeve are matched to one another in such a way that a friction torque of at least 0.3 Ncm to 1.0 Ncm maximum, preferably at least 0.3 Ncm to 0.7 Ncm maximum, preferably 0.5 Ncm, is achieved when the screw part with the sleeve is inserted into the through hole. In particular, this friction torque is already achieved before the threaded portion of the screw part is screwed into the threaded bore, in particular solely due to the contact of the at least one radial elevation structure of the sleeve with an inner circumferential wall of the through hole. It is thus even possible to achieve an increase of approximately 10% to 15% in the friction torque, compared to the friction torque that is achieved with a conventional screw part when the sleeve is compressed back in the internal thread of the threaded bore. However, the screw part and the hinge arrangement may be matched to one another in such a way that, as the result of a back-compression effect of the sleeve in the internal thread of the threaded bore, an additional friction torque arises, by means of which the constant friction torque described here is increased.

The values stated herein for the friction torque refer in particular to a screw part and a hinge arrangement that are used in the eyeglass sector, in particular for thread sizes of at least M 1.2 to M 1.6 maximum, preferably for M 1.4 (metric thread). For other sizes of the hinge arrangement and of the screw part, different friction torques may be achieved; in particular for larger screw parts and hinge arrangements, higher friction torques may also be achieved.

According to one refinement of the invention, it is provided that the through hole of the hinge part and the outer circumferential face of the sleeve outside the at least one radial elevation structure have a tolerance of up to at least 3% up to 6% maximum, preferably up to at least 3% to 4% maximum, preferably up to 3.5%, of the nominal diameter of the thread of the screw part. This is a relatively large tolerance, although it is possible due to the fact that it can be compensated for by the at least one radial elevation structure. Thus, the tolerance for a metric screw having a nominal size of M 1.2 to M 1.6, preferably M 1.4, is preferably ±0.05 mm. That the tolerance is determined at the outer circumferential face of the sleeve outside the radial elevation structure means in particular that the tolerance is determined in the area of a smallest diameter of the circumferential face of the sleeve where the latter has no radial elevation structure. In this regard, it may be assumed that the sleeve has an imaginary cylindrical outer circumferential face, starting from which the radial elevation structure extends radially outwardly, wherein the tolerance consideration here is based on the diameter of this imaginary cylindrical outer circumferential face.

According to one refinement of the invention, it is provided that the sleeve on the one hand and the hinge parts of the hinge arrangement on the other hand are matched to one another in such a way that the sleeve is compressed, at least in areas, when the external thread is axially screwed into the threaded bore. The constant friction torque, which exists anyway due to the at least one radial elevation structure, may thus be increased even further, as discussed above. However, it is also possible to avoid such back-compression of the sleeve, for example by there being no overlap of the sleeve with the at least one external thread.

According to one refinement of the invention, it is provided that the hinge arrangement is configured for use in eyeglasses, in particular for an eyeglass frame, particularly preferably for connecting a middle part of eyeglasses to an earpiece. In addition, particularly wide earpieces may be connected to middle parts of eyeglasses by means of the screw part and the hinge arrangement proposed here. For various designs, in particular for various widths of earpieces, a smaller number of screw part variants is required in comparison to known screw parts, due to the fact that with regard to the length adjustment of the screw part, it does not matter whether and to what extent a back-compression effect occurs in an internal thread of the threaded bore for the sleeve.

Lastly, according to one refinement of the invention it is provided that the first hinge part has a multi-tab design. It is possible for the second hinge part to have one less tab than the first hinge part. In particular, it is possible for the first hinge part to have a two-tab design, with the second hinge part having a one-tab design. However, as described above, other numbers of hinge tabs may be easily implemented for the hinge parts.

The invention also encompasses an eyeglass frame having a hinge arrangement according to one of the exemplary embodiments described above, or a screw part according to one of the exemplary embodiments described above. The eyeglass frame may also have the screw part, for example, as a fastening means on a closing block, which is provided in particular to clamp eyeglass lenses in the eyeglass frame. In particular the advantages already explained with regard to the screw part and the hinge arrangement are achieved with regard to the eyeglass frame.

The invention is explained in greater detail below with reference to the drawings, which show the following:

Figure 1:
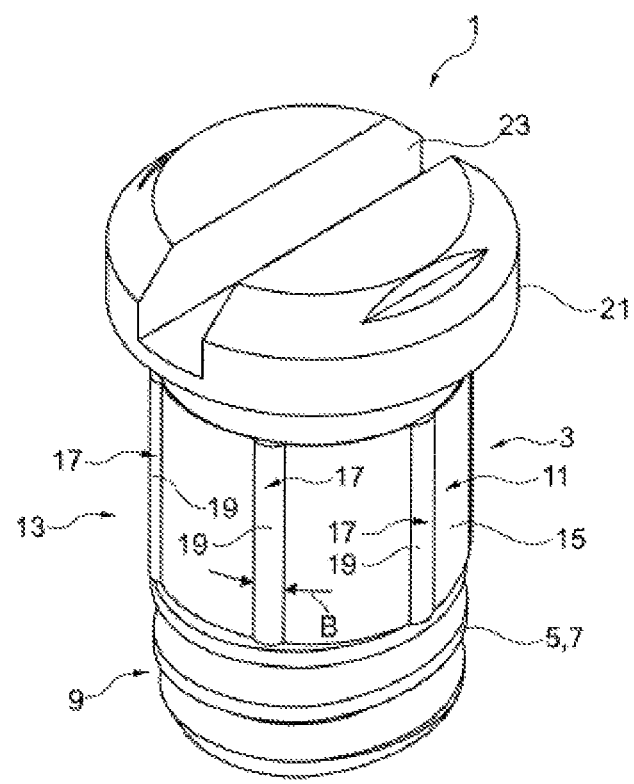
FIG. 1 shows a schematic illustration of one exemplary embodiment of a screw part.

FIG. 1 shows a schematic illustration of one exemplary embodiment of a screw part 1, which has a shank 3 having, at least in areas, at least one external thread 5, in the present case an external thread 7 in a threaded portion 9. In addition, the screw part 1 has a sleeve 11 that encloses, in the present case completely encloses, the shank 3, viewed in the circumferential direction, around more than three-fourths of its circumference. The sleeve 11 in particular has a closed design, viewed in the circumferential direction. The sleeve, viewed in the longitudinal direction of the shank 3, which in the present case is a vertical direction in the figure, extends along a sleeve portion 13.

The sleeve 11 on its outer circumferential face 15 has at least one radial elevation structure, and in particular in the exemplary embodiment illustrated here has six radial elevation structures 17, of which three radial elevation structures 17 are illustrated in FIG. 1. The other radial elevation structures 17 are concealed in FIG. 1. The radial elevation structures 17 each have at least one structural element 19 having an elastic design in the radial direction, in the present case in particular each of the radial elevation structures 17 having one structural element 19, and in particular the structural elements 19 each forming the radial elevation structures 17 here. Alternatively, it is possible for at least one of the radial elevation structures 17 to have a plurality of structural elements 19 or to be formed from a plurality of structural elements 19. The structural elements 19 have an elastic design in the radial direction.

The elevation structures 17 have an extent along the longitudinal direction of the screw part 1 on the outer circumferential face 15 that is greater than a width B of the structural elements 19. The width B is measured perpendicular to the longest extent of the structural elements 19. In the exemplary embodiment illustrated here, the structural elements 19, and thus also the radial elevation structures 17, extend in particular in the longitudinal direction, i.e., in the vertical direction in FIG. 1, the width B of the structural elements 19 therefore being measured in the circumferential direction.

By means of the radial elevation structures 17, it is possible in particular for the sleeve 11 to already generate a constant friction torque when the screw part 1 is inserted into a borehole, as the result of which the screw part 1 may be captively situated in the borehole, and it is thus possible to adjust a friction torque, in particular of a hinge arrangement, in a more accurate and defined manner. At the same time, this allows increased compensation for borehole tolerances by the radial elevation structures 17, wherein in particular out-of-round eccentricities of a borehole into which the screw part is inserted may also be compensated for. A continuous connection may be provided due to the constant contact of the sleeve 11 with the elevation structures 17 against the borehole.

The screw part 1 illustrated here is designed in particular as a screw having a head 21. The head 21 in turn has a torque introduction means 23, designed here as a slot. The torque introduction means 23 may also be designed as a cross slot engagement, as a cross engagement, as a Torx engagement, or the like. The screw part 1 may also be designed as a threaded pin, as a grub screw, as a stay bolt, or the like.

In the exemplary embodiment illustrated here, the elevation structures 17 extend completely over the entire height of the sleeve 11, measured in the longitudinal direction. Alternatively, it is possible for the elevation structures 17 not to extend over the entire height of the sleeve 11, but to preferably extend at least along at least two-thirds of the height of the sleeve 11.

The elevation structures 17 are designed here as ribs or each have a rib as the structural element 19, the ribs extending in the longitudinal direction of the screw part 1. Alternatively, it is also possible for at least one of the elevation structures 17 to have a plurality of knobs as structural elements, or for at least one of the elevation structures 17 to have a linear, spindle-shaped, helical, or conical design, in particular to be designed as a linear, spindle-shaped, helical, or conical elevation, or to have a structural element 19 that is designed as a linear, spindle-shaped, helical, or conical elevation. At least one of the structural elements 19 preferably has a rounded, in particular partially cylindrical, partially spherical, or partially conical, or angled, in particular polygonal, contour, in particular viewed in the transverse and/or longitudinal section. The structural elements 19 illustrated here have in particular a partially cylindrical contour.

In the exemplary embodiment illustrated here, the elevation structures 17 are arranged symmetrically, i.e., in particular at equal angular intervals, along a circumferential line of the sleeve 11.

The overall sleeve 11, i.e., as a whole, preferably has an elastic design, it preferably being provided that the elevation structures 17 and/or the structural elements 19 are formed in one piece with the sleeve 11.

The sleeve 11 preferably contains at least one plastic or is made of at least one plastic.

The shank 3 of the screw part 1 in the sleeve portion 13 is preferably extrusion-coated with the sleeve 11, in particular with the material of the sleeve 11. The screw part 1 together with the sleeve 11 is thus preferably manufactured in an injection molding process, in particular in a plastic injection molding process. In the screw part 1 proposed here, tolerances with regard to the length of the sleeve 11, which result from insufficient sealing in the area of the threaded portion 9, is no longer a significant factor, in particular since the friction torque of the screw part 1 in a borehole into which it is inserted is determined essentially by the radial elevation structures 17.

The shank 3 of the screw part 1 preferably contains at least one plastic or at least one metal or a metal alloy. The shank 3 is preferably made of at least one plastic, or of at least one metal, or at least one metal alloy.

It is preferably provided that the sleeve 11 protrudes into the threaded shank 9, so that the sleeve portion 13 and the threaded portion 9 on the screw part 1 overlap. This allows, in addition to the constant friction torque generated by the radial elevation structures 17, an additional friction torque when the screw part 1 is screwed into an internal thread, the sleeve 11 then being compressed back in the area of the threaded portion 9, thus experiencing axial compression that results in an in particular localized increase in diameter of the sleeve 11. As discussed, this effect may be used to advantageously increase the friction torque of the screw part 1 in a borehole. However, since a constant friction torque is provided via the radial elevation structures 17, this additional friction torque is not necessary due to the back-compression effect, and, if provided, this additional friction torque is also of secondary importance. Therefore, an actual length of the sleeve 11 is not of major consequence, nor is whether the sleeve 11 actually comes into engagement with an internal thread of a threaded bore and is compressed back. Therefore, the screw part 1 may be used, without changes, in particular on the length of the sleeve 11 for various applications, in particular for different widths of hinge parts of eyeglasses, so that the number of variants of the screw part 1 to be kept on hand is reduced.

Figure 2:
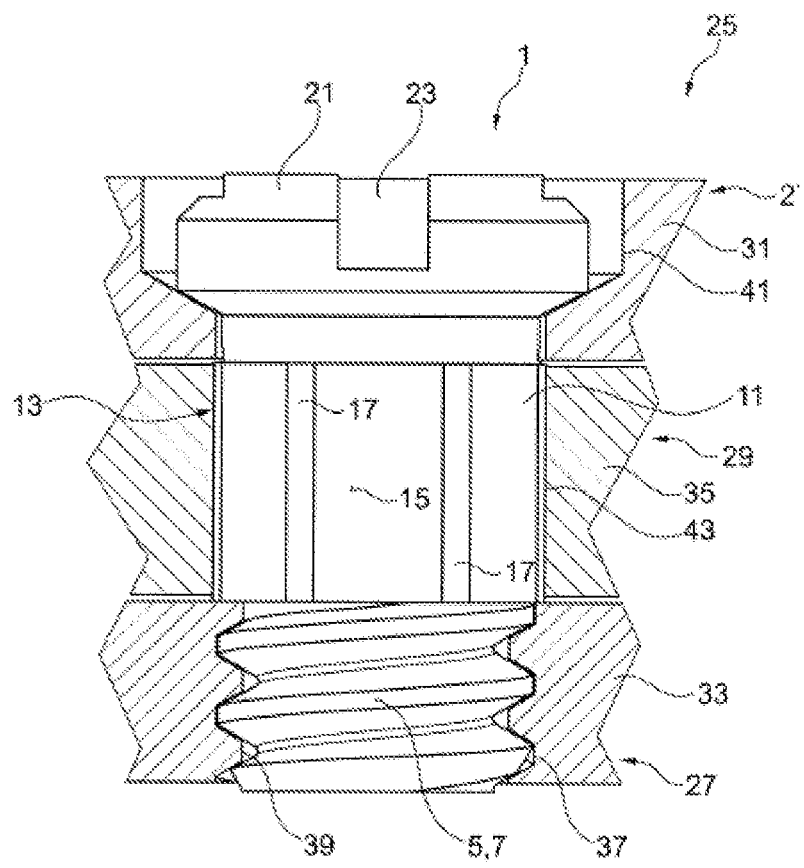
FIG. 2 shows a schematic illustration of one exemplary embodiment of a hinge arrangement having the screw part according to FIG. 1.

FIG. 2 shows a schematic illustration of one exemplary embodiment of a hinge arrangement 25 having a screw part 1 according to the exemplary embodiment from FIG. 1. Identical and functionally equivalent elements are provided with the same reference numerals, so that in this regard reference is made to the preceding description. The hinge arrangement 25 has a first hinge part 27 and a second hinge part 29. In the exemplary embodiment of the hinge arrangement 25 illustrated here, the first hinge part 27 is designed as a two-tab hinge part, and has a first, in the present case upper, hinge tab 31, and a second, in the present case lower, hinge tab 33, a space being formed between the first hinge tab 31 and the second hinge tab 33 in which a third hinge tab 35 of the second hinge part 29, which is designed as a one-tab hinge part and in this regard has only the third hinge tab 35, is situated.

The first hinge part 27, in particular in the second hinge tab 33 in the present case, has a threaded bore 37 with an internal thread 39. The first hinge part 27 here has a countersunk hole 41 in the first hinge tab 31 for placement of the head 21 of the screw part 1.

The second hinge part 29 in its single third hinge tab 35 has a through hole 43 that is free of an internal thread. The hinge parts 27, 29 in the mounted state of the hinge arrangement 25 illustrated in FIG. 2 are situated and configured relative to one another in such a way that the through hole 43 is aligned with the threaded bore 37, and in particular also with the countersunk hole 41. It is also shown that the external thread turn 5 or the external thread 7 is configured and matched to the internal thread 39 in such a way that the external thread 7 in the mounted state engages with the internal thread 39 of the first hinge part 27. The sleeve 11 is configured and matched to the through hole 43 in such a way that it already comes into frictional contact with the through hole 43 when the screw part 1 is inserted therein, in particular when the sleeve portion 13 is introduced into the through hole 43. In this way, a constant friction torque is already generated upon insertion of the screw part 1 into the hinge arrangement 25.

The hinge arrangement 25 is preferably designed as an eyeglass hinge, in particular for the articulated connection of a middle part of eyeglasses to an earpiece.

The through hole 43 and the sleeve 11 are in particular matched to one another in such a way that upon insertion of the screw part 1 into the through hole 43 a friction torque of at least 0.3 Ncm to 1.0 Ncm maximum, preferably at least 0.3 Ncm to 0.7 Ncm maximum, preferably 0.5 Ncm, is generated as constant friction torque between the elevation structures 17 and the through hole 43.

The through hole 43 and the outer circumferential face 15 outside the elevation structures 17 preferably have a tolerance of at least up to 3% to 6% maximum, preferably at least up to 3% to 4% maximum, preferably up to 3.5%, with respect to one another.

The sleeve 11 and the hinge parts 27, 29 are preferably matched to one another in such a way that the sleeve 11 is axially compressed, at least in areas, when the external thread 7 is screwed into the threaded bore 37. However, a design is also possible in which the sleeve 11 in the mounted state does not come into engagement with the internal thread 39.

Figure 3:
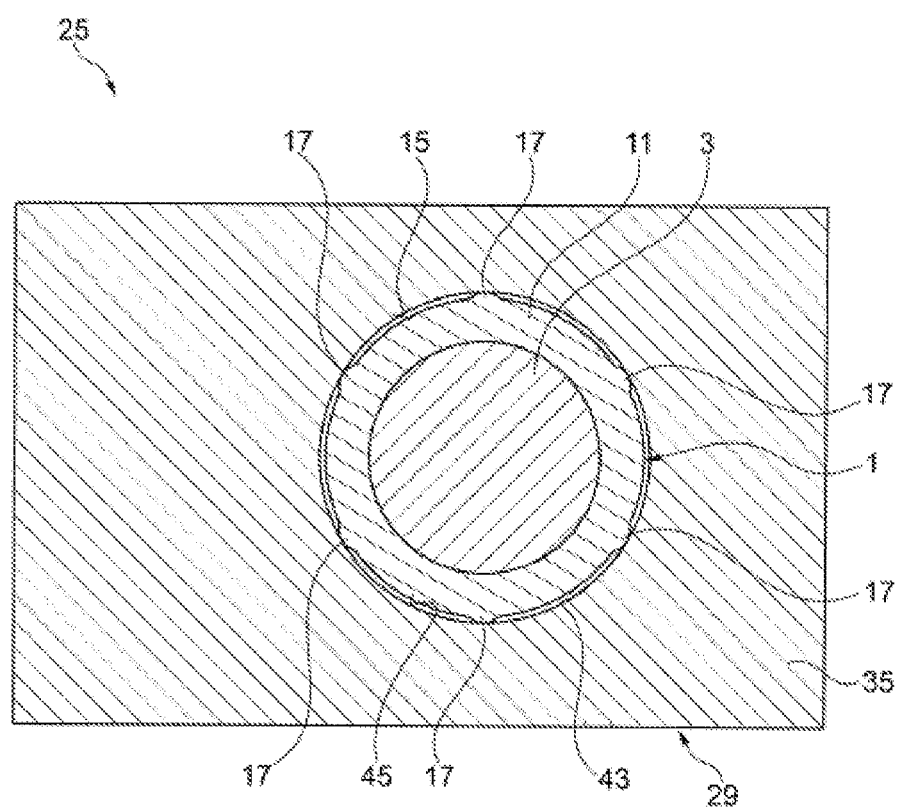
FIG. 3 shows a schematic cross-sectional illustration of the exemplary embodiment of the hinge arrangement according to FIG. 2.

FIG. 3 shows a schematic sectional illustration of the exemplary embodiment of the hinge arrangement 25 according to FIG. 2, the section plane being oriented perpendicularly with respect to the plane of the drawing in FIG. 2, and situated in the area of the third hinge tab 35.

Identical and functionally equivalent elements are provided with the same reference numerals, so that in this regard reference is made to the preceding description. It is apparent that when the screw part 1 is inserted into the through hole 43, the elevation structures 17 rest against an inner wall 45 of the through hole 43, and they are at least partially elastically compressed, viewed in the radial direction. The elevation structures 17 are able to compensate for tolerances with regard to the outer diameter of the sleeve 11 on the one hand and the through hole 43 on the other hand, as well as out-of-round eccentricities of the through hole 43. The radial elevation structures 17 resting against the inner wall 45 generate a constant friction torque, which is already active upon loosely inserting the screw part 1 into the through hole 43. This is easily adjustable in a defined manner by the selection of the number, type, design, and in particular the geometry of the radial elevation structures 17.

Figure 4:
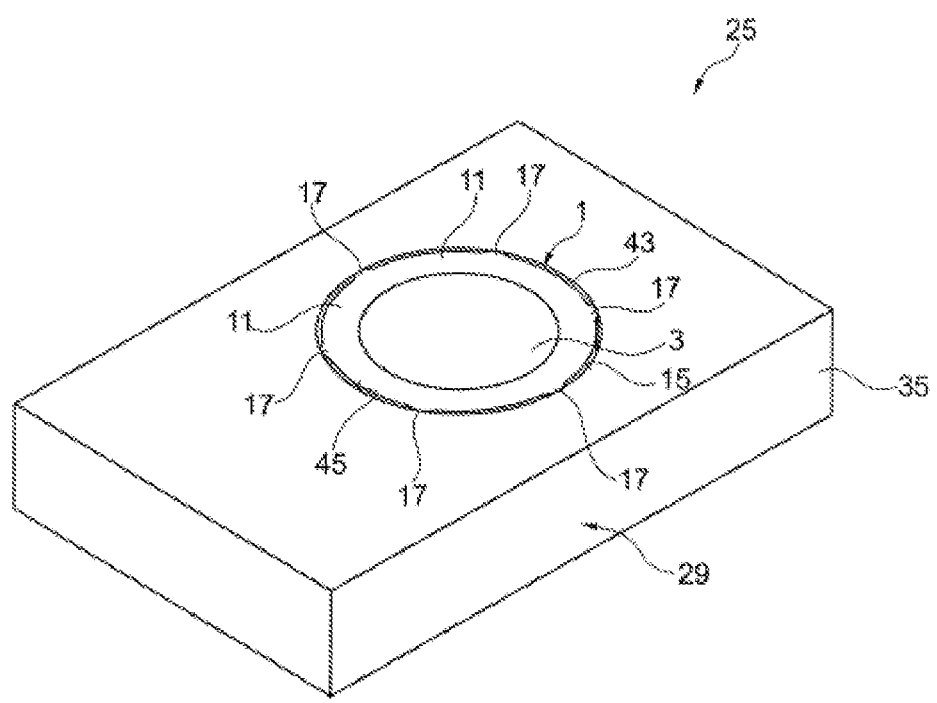
FIG. 4 shows another schematic illustration of the exemplary embodiment of the hinge arrangement according to FIGS. 2 and 3.

FIG. 4 shows another schematic detailed illustration of the exemplary embodiment of the hinge arrangement 25 according to FIGS. 2 and 3. Identical and functionally equivalent elements are provided with the same reference numerals, so that in this regard reference is made to the preceding description. It is also clear from this three-dimensional illustration that the elevation structures 17 rest against the inner wall 45 of the through hole 43 when the sleeve 11 is inserted into the through hole 43, so that a constant friction torque is generated.

In summary, it has been shown that with the screw part 1 and the hinge arrangement 25 proposed herein, a constant friction torque may be adjusted in a defined manner, and furthermore the screw part 1 may be captively situated in a borehole even before an actual screwing operation.

The invention claimed is:

1. A screw part comprising: a shank having a threaded portion with at least one external thread turn; and a sleeve surrounding the shank in a circumferential direction around more than three-fourths of the circumference, the sleeve extending along a sleeve portion in a longitudinal direction of the shank, the sleeve having at least one radial elevation structure on an outer circumferential face, the at least one radial elevation structure having at least one structural element that has an elastic design in a radial direction, the at least one radial elevation structure has an extent, on an outer circumferential face of the sleeve along the longitudinal direction, that is greater than a width of the at least one structural element.

2. The screw part according to claim 1, wherein the at least one elevation structure extends: a) along at least two-thirds of a height of the sleeve, measured in the longitudinal direction, or b) extends completely over an entirety of the height of the sleeve, measured in the longitudinal direction.

3. The screw part according to claim 1, wherein the at least one elevation structure selected from a group consisting of: a) a rib extending in the longitudinal direction, b) a plurality of knobs, c) a linear, helical, or conical elevation, d) the at least one structural element, viewed one of a cross section and a longitudinal section, has one of a rounded contour and an angular contour, and e) combinations thereof.

4. The screw part according to claim 1, wherein the screw part has a plurality of elevation structures, the elevation structures arranged symmetrically along a circumferential line of the sleeve.

5. The screw part according to claim 1, wherein the sleeve as a whole is elastic.

6. The screw part according to claim 1, wherein the sleeve contains at least one plastic or is made of at least one plastic.

7. The screw part according to claim 1, wherein the shank in the sleeve portion is extrusion-coated with the sleeve.

8. The screw part according to claim 1, wherein the shank contains at least one plastic, at least one metal, or at least one metal alloy, or that the shank is made of at least one plastic, at least one metal, or at least one metal alloy.

9. The screw part according to claim 1, wherein the sleeve protrudes into the threaded portion of the shank.

10. The screw part according to claim 1 in combination with a hinge arrangement, the hinge arrangement comprising: a first hinge part with a threaded bore; and a second hinge part with a through hole, the through hole and the threaded bore are configured to align with one another in a mounted state of the hinge arrangement, wherein the at least one external thread turn of the screw part is configured to engage with an internal thread of the threaded bore, and wherein the sleeve is configured to be in frictional contact with the through hole when the sleeve portion of the screw part is inserted into the through hole.

11. The hinge arrangement according to claim 10, wherein the through hole and the sleeve are matched to one another in such a way that a friction torque of at least 0.3 Ncm to 1.0 Ncm maximum, preferably at least 0.3 Ncm to 0.7 Ncm maximum, preferably 0.5 Ncm, is generated when the sleeve is situated in the through hole.

12. The hinge arrangement according to claim 10, wherein the through hole of the second hinge part and the outer circumferential face of the sleeve outside the at least one elevation structure have a tolerance of up to at least 3% up to 6% maximum, preferably up to at least 3% to 4% maximum, preferably up to 3.5%, with respect to one another.

13. The hinge arrangement according to claim 10, wherein the sleeve and the hinge parts are matched to one another in such a way that the sleeve is axially compressed, at least in areas, when the at least one external thread turn is screwed into the threaded bore.

14. The hinge arrangement according to claim 10, wherein the hinge arrangement is designed as a hinge arrangement for eyeglasses.

15. The hinge arrangement according to claim 10, wherein the first hinge part has a multi-tab design.

16. The hinge arrangement according to claim 10, wherein the second hinge part circumferentially surrounds the at least one structural element having the elastic design in the radial direction, wherein the second hinge part is rotatable relative to the at least one structural element, and wherein the at least one structural element contacts the second hinge part to impart a constant frictional torque to the second hinge part as the second hinge part rotates relative to the at least one structural element.

17. A hinge arrangement for eyeglasses, the hinge arrangement comprising:
a first hinge part with a threaded bore; a second hinge part with a through hole, the through hole and the threaded bore configured to align with one another in a mounted state of the hinge arrangement;
a screw including a screw head and a shank having a threaded portion with at least one external thread turn engaging an internal thread of the threaded bore; and
a sleeve surrounding the shank in a circumferential direction, the sleeve extending along a sleeve portion in a longitudinal direction of the shank, the sleeve having at least elastic rib extending in the longitudinal direction of the shank on an outer circumferential face of the sleeve,
wherein the second hinge part circumferentially surrounds the at least one structural element having the elastic design in the radial direction, wherein the second hinge part is rotatable relative to the at least one structural element, and wherein the at least one structural element contacts the second hinge part to impart a constant frictional torque to the second hinge part.

\* \* \* \* \*